(12) United States Patent
Andersson et al.

(10) Patent No.: US 8,256,632 B2
(45) Date of Patent: Sep. 4, 2012

(54) TAMPER-EVIDENT OPENING DEVICE, SCREW CAP FOR USE IN SUCH AN OPENING DEVICE AND METHOD OF FORMING SUCH AN OPENING DEVICE

(75) Inventors: Pär Andersson, Lund (SE); Patrik Månsson, Staffanstorp (SE); Cristiano Casale, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 840 days.

(21) Appl. No.: 12/307,092

(22) PCT Filed: Jun. 28, 2007

(86) PCT No.: PCT/SE2007/000633
§ 371 (c)(1),
(2), (4) Date: Dec. 30, 2008

(87) PCT Pub. No.: WO2008/002249
PCT Pub. Date: Jan. 3, 2008

(65) Prior Publication Data
US 2009/0308833 A1 Dec. 17, 2009

(30) Foreign Application Priority Data
Jun. 30, 2006 (SE) ........................................ 0601429

(51) Int. Cl.
*B65D 41/34* (2006.01)
*B29D 1/00* (2006.01)
(52) U.S. Cl. ............................ 215/252; 215/44; 264/318

(58) Field of Classification Search .................... 215/44, 215/252, 253, 43, 45; 264/318; 222/541.1, 222/541.5, 541.6
See application file for complete search history.

(56) References Cited

U.S. PATENT DOCUMENTS

| 4,021,524 A | | 5/1977 | Grimsley | |
|---|---|---|---|---|
| 4,241,842 A | * | 12/1980 | Toeppen | ........................ 215/252 |
| 4,518,554 A | | 5/1985 | Hatakeyama et al. | |
| 5,667,745 A | | 9/1997 | Andersson | |
| 6,000,568 A | * | 12/1999 | Verter | ............................ 215/252 |

FOREIGN PATENT DOCUMENTS
EP 2 105 386 A 9/2009
(Continued)

OTHER PUBLICATIONS

Supplementary European Search Report dated Apr. 7, 2011, issued in corresponding European Patent Application No. 07 748 293.

(Continued)

*Primary Examiner* — Robin Hylton
(74) *Attorney, Agent, or Firm* — Buchanan Ingersoll & Rooney PC

(57) ABSTRACT

An opening device for a packaging container comprises a neck portion and a screw cap. The opening device comprises a wall of the first part of the screw cap being with a weakening extending in a circumferential direction of the first part and a recess extending in a longitudinal center axis direction of the first part. The recess is arranged to receive a projection of the neck portion, which projection is directly injection-molded in the recess. A tamper flap of the first part, which tamper flap is defined by the weakening and the recess, is automatically deformable in connection with a first time opening of the packaging container by cap rotation.

13 Claims, 5 Drawing Sheets

FOREIGN PATENT DOCUMENTS

| | | |
|---|---|---|
| GB | 1043970 | 9/1966 |
| GB | 2149765 A | 6/1985 |
| GB | 2225778 A | 6/1990 |
| JP | 59-48129 A | 3/1984 |
| JP | 11-511102 A | 9/1999 |
| JP | 2003-191980 A | 7/2003 |
| WO | WO 97/08071 A1 | 3/1997 |

OTHER PUBLICATIONS

International Search Report for PCT/SE2007/000633, completed Aug. 17, 2007.

English language translation of an Official Action issued Jun. 23, 2011 by the Japanese Patent Office in corresponding Japanese Patent Application No. 2009-516447.

* cited by examiner

TAMPER-EVIDENT OPENING DEVICE, SCREW CAP FOR USE IN SUCH AN OPENING DEVICE AND METHOD OF FORMING SUCH AN OPENING DEVICE

TECHNICAL FIELD OF THE INVENTION

The present invention relates to an opening device for a packaging container, comprising a neck portion and a screw cap, the screw cap having a tubular first part arranged to enclose the neck portion and engage with the same to secure the screw cap to the packaging container and a second part arranged to close the first part at one end thereof. The invention also relates to a screw cap for use in such an opening device and a method of forming such an opening device.

BACKGROUND ART

Within the food industry, beverages and other products are often packed in paper or paperboard based packages. Packages intended for liquid food are often produced from a packaging laminate comprising a core layer of paper or paperboard and an outer, liquid-tight layer of thermoplastic material on at least that side of the core layer which will form the inside of the packages.

One kind of frequently occurring packages are the so-called carton bottles. In substance, these are composed of a lower part in the form of a sleeve of packaging laminate like the one described above, and an upper part in the form of a plastic top having a neck which is provided with an opening/closing means, such as a screw cap. The carton bottles are often produced in that sheets, so-called blanks, of packaging laminate are formed into tubes which are closed by sealing of two opposing edges of each sheet in an overlapping condition. Then, according to a first alternative, each tube is closed at one end by a top of thermoplastic material being directly injection-molded onto the tube at that end. The injection-molded top has a neck sealed by a membrane. In connection with a first time opening of the package, this membrane should be torn off along a tear notch, which is also produced in the injection-molding operation, to enable consumption of the product in the package. After injection-molding, the package is filled, sealed at the open end of the tube for achieving a sleeve and closing the package, and formed into the desired shape. Finally, the neck of the top is provided with a screw cap to enable opening and closing of the package when the membrane has been removed. Packages of this kind are commercialized by the applicant under the name Tetra Top (registered trade mark).

According to a second alternative, instead of injection-molding a top directly onto the tube, the tube is slipped over a respective premade plastic top and arranged in such a way that a major part of the top protrudes from the tube. The premade top has a neck closed by a screw cap. After sealing of the top and the tube along a contact surface between them, the package is filled, sealed at the open end of the tube for achieving a sleeve and closing the package, and finally formed into the desired shape. As opposed to the package described in the paragraph above, this package has a one-step opening since no membrane needs to be removed to open the package. Packages of this kind are commercialized by the applicant under the name Tetra Aptiva (registered trade mark).

Injection-molding of a top directly onto a tube in production of a package is, in many situations, desirable. On the other hand, a one-step opening of a package may also often be preferable. Reasons for this are, among others, that the first time opening of a two-step opening package often will result in a loose part, for example in the form of a membrane, which loose part could increase the risk of littering or of children choking when being in contact with the package. In U.S. Pat. No. 4,518,554, a method and an apparatus for molding a container enabling a combination of these two features are disclosed. In accordance with this document, a cap is arranged with its open end facing outwardly in a female die. A male die, which is insertable into the female die and into the cap when the cap is arranged therein, is also provided. A top end portion of a preformed container body is partly inserted into the cavity formed between the female die with the cap arranged therein and the male die. Then, a synthetic resin is injected into the cavity to form the neck portion on the container body.

To give a consumer the possibility of investigating whether a package has been opened earlier, different types of safety means, so-called tamper proofs, exist. These are broken by the consumer in connection with a first time opening of the package.

The first package described above, whose top is injection-molded directly onto the tube, has a built-in tamper proof in the form of the membrane. To be able to open this package (in the proper way) for the first time, the membrane needs to be removed. Thus, if the membrane is removed, the consumer knows that the package has been opened earlier.

The second package described above, whose top is premade before assembly with the tube, can be provided with a well-known taper proof in the form of a ring which, through breakable, thin connections spaced evenly along the ring, is attached to the bottom end of the screw cap. The ring is permanently connected to the neck of the top which means that the connections between the ring and the cap must be broken to enable removal of the cap from the package in connection with opening of the same. Thus, if the ring is disconnected from the cap, the consumer knows that the package has been opened earlier. The ring is locked to the neck by an annular flange arranged at a predetermined distance from the pouring opening of the package. The flange permits rotation of the ring but hinders movement of the ring in an upward longitudinal direction of the package. When the screw cap is turned for opening of the package, the threading forces the cap in the upward longitudinal direction. Since movement of the ring is obstructed in this direction, the thin connections between the ring and the cap are broken, one by one, by the cap turning. The ring is formed integrally with the screw cap and applied onto the top in connection with the capping operation.

The third package described above, whose neck portion is directly injection-molded into the screw cap and onto the container body, has no built-in tamper proof. Further, a tamper proof as the one described above cannot be used in connection with this package since the resin injected into the cavity between the dies will fill all open spaces, also the open spaces between the ring and the screw cap. Thus, after such an injection, the spaces between the breakable ring-cap connections will be filled with resin. This will prevent the ring from rotating in connection with turning of the cap which means that all the connections between the ring and the cap will have to be broken essentially at the same time to enable opening of the package. Such an operation requires very high strength and the package will be extremely hard, or even impossible, to open. Clearly, this kind of tamper proof is very badly suited for this application. Accordingly, there exists a great need for a working tamper solution for packages of this and similar types.

SUMMARY OF THE INVENTION

An object of the present invention is to provide an opening device, a screw cap for use in such an opening device and a method of forming such an opening device which, at least partly, eliminate potential limitations of prior art. The basic concept of the invention is to provide a tamper solution suitable for a one-step opening package or packaging container having a neck portion of which at least a part is directly injection-molded in connection with the manufacturing of the package. Said at least a part is arranged to "stand in the way" of a portion of the screw cap in the turning direction of the screw cap so as to cause a deformation of the screw cap when this is turned for a first time opening of the package. Thus, if the screw cap presents a certain deformation, the consumer knows that the package has been opened earlier.

The opening device, screw cap and forming method for achieving the object above are defined in the appended claims and discussed below.

An opening device for a packaging container according to the present invention comprises a neck portion and a screw cap. The screw cap has a tubular first part arranged to enclose the neck portion and engage with the same to secure the screw cap to the packaging container and a second part arranged to close the first part at one end thereof. The opening device is characterized in that a wall of the first part of the screw cap is provided with a weakening extending in a circumferential direction of the first part and a recess extending in a longitudinal center axis direction of the first part. The recess is arranged to receive a projection of the neck portion, which projection is directly injection-molded in the recess. A tamper flap of the first part, which tamper flap is defined by the weakening and the recess, is automatically deformable in connection with a first time opening of the packaging container by cap rotation. This is because of an edge of the tamper flap, which edge is defined by a surface of the recess, being initially obstructed in a cap rotation direction by the projection of the neck portion.

As stated above, the weakening extends in the circumferential direction of the first part. Naturally, the weakening may have a certain extension also in the longitudinal center axis direction of the first part, which center axis direction is perpendicular to the circumferential direction of the first part.

Similarly, the recess extends in the longitudinal center axis direction of the first part. Naturally, the recess may have a certain extension also in the circumferential direction of the first part.

The weakening can be of many different kinds, e.g. a slit or a notch, continuous or discontinuous and formed in the inside or the outside of the first part of the screw cap. Naturally, the weakening may also be through, i.e. extend all the way through the wall of the first part, from the inside to the outside thereof.

Similarly, the recess can be formed in many different ways, e.g. as a hole or a slot, continuous or discontinuous and formed in the inside of the first part of the screw cap. Naturally, the recess may also be through, i.e. extend all the way through the wall of the first part, from the inside to the outside thereof.

The weakening and the recess may meet each other at some point, e.g. at a respective one of their ends, or be separated form each other. If the weakening and the recess are separated, the material between them will have to broken in order to release the tamper flap.

The projection of the neck portion is injection-molded directly in the recess. As the name implies, a directly injection-molded projection is a projection which is not pre-produced but instead produced, with the recess as template, in connection with assembly with screw cap. This means that at least a part of the screw cap is used as a mold. Thereby, the projection will fill the entire recess and engage precisely with the same to achieve the desired tamper function. More particularly, the projection will prevent the edge of the tamper flap from moving in the rotation direction of the screw cap when the package is opened for the first time. Instead, the edge will initially be locked against the projection which will cause the release and deformation of the tamper flap. If the recess and the weakening are not through in the wall of the first part, this release means that the wall has to be broken along the weakening and the recess.

Thus, the proof that the package has once been opened is the deformation of the tamper flap of the screw cap. An advantage with the invention is that a consumer easily can see if the package is unopened by just looking at the screw cap. Another advantage is the great reliability of the opening device which is achieved partly by the direct injection-molding of the projection in the recess. Further, the package will still be easy to open since little or no extra torque is required to release the tamper flap. Also, the invention is beneficial when it comes to consumption of material. The tamper function is integrated in the screw cap which means that no additional element, such as a ring, is required. Finally, the invention is advantageous since it is mechanically relatively simple to realize.

The inventive opening device can be so constructed that the edge of the tamper flap is arranged to engage with the projection of the neck portion during initial rotation of the cap a predetermined number of degrees. During this initial rotation the tamper flap will form a growing loop projecting from the wall of the first part. Hereby it can be ensured that a complete release and a clear deformation of the tamper flap is achieved. According to this embodiment, the edge of the tamper flap is arranged to be released from engagement with the projection of the neck portion after the initial rotation of the cap the predetermined number of degrees. Hereby it can be ensured that the package is easy to open. Depending on which material the screw cap is composed of, the deformation will remain to some extent after the tamper flap has been released from engagement with the projection of the neck. Thereby, it will be obvious, even with the screw cap put back onto the package, that the package has once been opened.

The opening device according to the invention can be such that a part of the projection initially is arranged outside at least a part of the edge of the tamper flap. This enables for the tamper flap to be locked under the projection in the area of the edge adapted for cooperation with the projection. An advantage of this embodiment is that obstruction of the tamper flap edge in the cap rotation direction is facilitated.

According to one embodiment of the invention, the surface of the recess defining said edge of the tamper flap extends into the wall of the first part with a pre-determined angle in relation to a radial direction of the first part. Thus, this surface, seen from an inner side of the screw cap, is inclined away from a center line of the recess, which center line extends in the radial direction of the first part. An advantage with this embodiment is that it is mechanically relatively uncomplicated to realize.

As discussed above, the weakening and the recess may be formed in different ways. As an example, the weakening could comprise two parallel sub weakenings arranged in the center of the wall of the first cap part and the recess could be arranged there between. Obviously, with such a design, the tamper flap will be formed of an intermediate part of the wall. However, according to a certain embodiment of the invention, the opening device is such that the weakening is arranged at a distance from an edge of the first part, which edge surrounds an open end of the first part, and the recess is arranged between the edge and the weakening. Here, the tamper flap is defined by the weakening, the recess and the edge. Obviously, with this design, the tamper flap will be formed of an edge part of the wall. The advantage of this embodiment is that a particularly mechanically simple construction of the opening device is enabled. In accordance with this embodiment, the upwards movement of the screw cap in connection with opening of the packaging container will not be obstructed by the projection of the neck portion, as obviously could be the case with a tamper flap formed of an intermediate part of the wall.

Not only the weakening and the recess but also the entire screw cap can be constructed in a large number of different ways. According to one embodiment of the present invention, the first part of the screw cap comprises upper and lower concentrically arranged tubular elements contacting each other along a contact line. The upper element is arranged between the second part of the screw cap and the lower element. A minimum distance between an inside of the lower element and the center axis of the first part is essentially equal to a minimum distance between an inside of the upper element and the center axis of the first part. Further, a maximum distance between an outside of the lower element and the center axis is larger than a maximum distance between an outside of the upper element and the center axis. This embodiment enables for the lower element to protrude from the upper element on the outside but be in line with the same on the inside. Further, the recess is formed in the lower element and the weakening comprises a groove in the inside of the lower element being formed at the contact line between the upper and lower elements. This embodiment is beneficial since it enables a particularly clever manufacturing of the screw cap.

A screw cap according to the present invention is adapted for use in an opening device according to the above.

A method according to the present invention of forming an opening device for a packaging container, the opening device including a neck portion and a screw cap, the screw cap having a tubular first part arranged to enclose the neck portion and engage with the same to secure the screw cap to the packaging container and a second part arranged to close the first part at one end thereof, comprises providing a female die having a receiving space. It further comprises arranging the screw cap in the receiving space of the female die with the first part facing outwardly, providing a male die insertable into the female die and thereby into the screw cap when the screw cap is arranged in the female die and inserting the male die into the female die. The method is characterized in further comprising providing a weakening in a wall of the first part of the screw cap, which weakening extends in a circumferential direction of the first part and providing a recess in the wall of the first part of the screw cap, which recess extends in a longitudinal center axis direction of the first part. It further comprises injecting a melt into a cavity formed between the screw cap and the male die to fill the recess with the melt and thereby form a projection of the neck portion which is received in the recess. The projection is arranged to cause an automatic deformation of a tamper flap of the first part, which tamper flap is defined by the weakening and the recess, in connection with a first time opening of the packaging container by cap rotation. This is achieved by the projection initially obstructing, in a cap rotation direction, an edge of the tamper flap, which edge is defined by a surface of the recess.

The characteristics discussed in connection with the inventive opening device are, of course, transferable to the inventive screw cap and method. Further, these characteristics may naturally be combined in the same embodiment.

BRIEF DESCRIPTION OF THE DRAWINGS

The invention will be described in more detail with reference to the appended schematic drawings, which show examples of presently non-limiting preferred embodiments of the invention.

DETAILED DESCRIPTION OF PREFERRED EMBODIMENTS

Figure 1A:
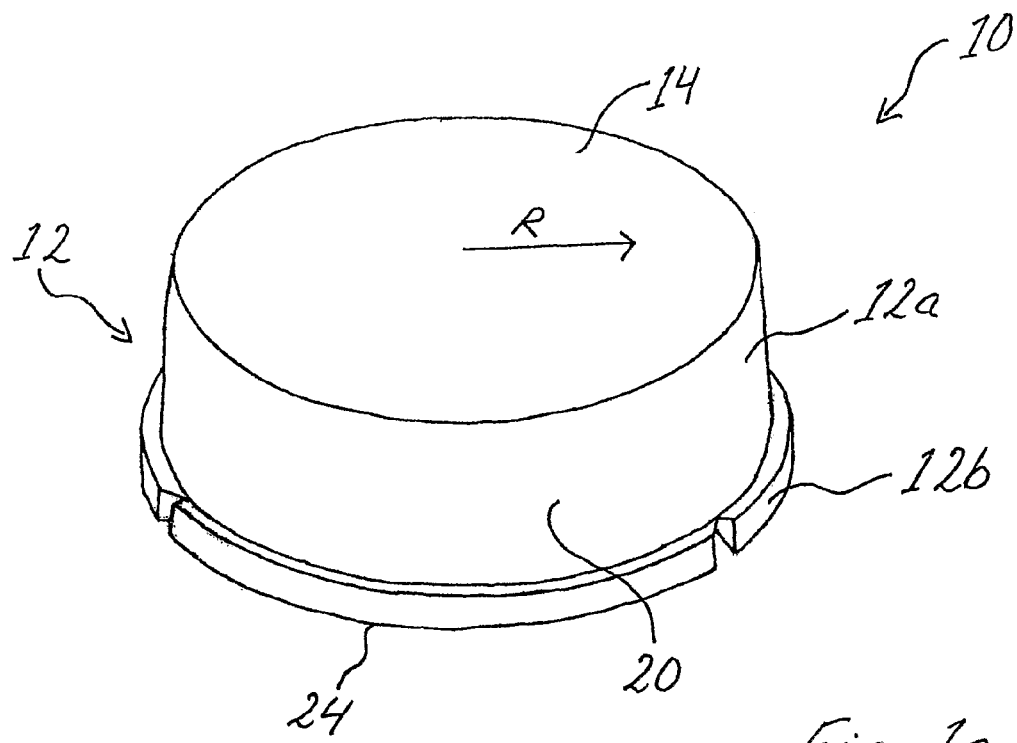
FIGS. 1a and 1b are perspective views of a screw cap according to a first embodiment of the present invention.
Figure 1B:
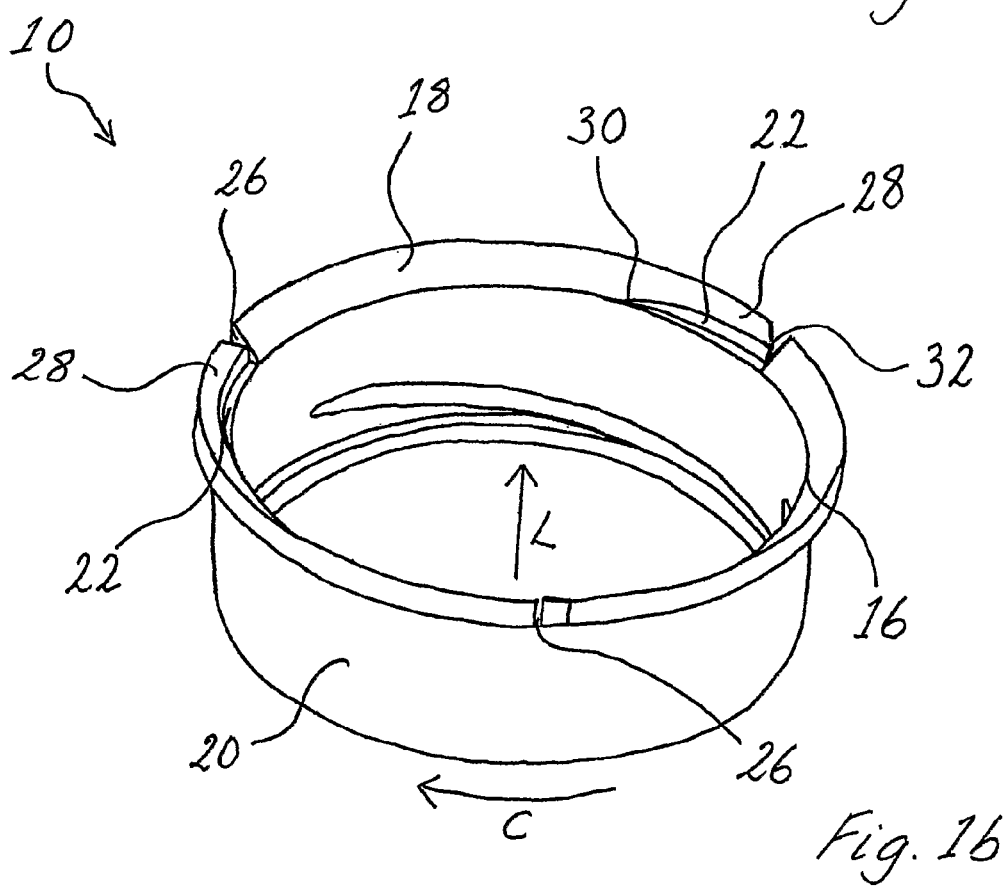

In FIGS. 1a and 1b, a screw cap 10 for use in an opening device for a packaging container in the form of a carton bottle is shown. The carton bottle is of the initially described type and comprises a top of thermo plastic material, here polyethylene, and a sleeve of packaging laminate. The screw cap 10 is comprised of a tubular first part 12 and a disc shaped second part 14 closing the first part at one end. The first and second parts 12 and 14 are integrally molded of a plastic material, here polypropylene. The first part 12 is threaded and arranged to enclose a correspondingly threaded neck portion of the top and engage with the same to secure the screw cap to the packaging container. Further, the first part 12 consists of a tubular upper element 12a and a tubular or annular lower element 12b. These elements are concentrically arranged and contact each other along a contact line 16. The upper and lower elements are arranged edge to edge at the inside of the screw cap. At the outside of the screw cap, the lower element 12b protrudes from the upper element 12a. As apparent from FIG. 1b, the edge 18 of the lower element 12b is bevelled. The reason for this is that the screw cap, as will be further described below, is used as a mold for producing the neck portion of the top. By the edge 18 being bevelled it is ensured that the melt for producing the neck portion is distributed on the inside, and not the outside, of the screw cap.

A wall 20 of the first part 12 is provided with three evenly distributed weakenings in the shape of grooves 22 extending in the circumferential direction C of the screw cap at a distance from an edge 24 of the first part. The grooves are formed as elongate indentations in the lower element 12b at the contact line 16. The base wall of each groove is formed by the upper element 12a of the first cap part whereas the side wall of each groove is formed by the lower element 12b of the first cap part. The width of the grooves in the radial direction R of the screw cap is essentially equal to the thickness of the wall 20 at the upper element 12a which means that the grooves will extend all the way through the wall 20, from the inside to the outside. Further, the wall 20 of the first part 12 is provided with three evenly distributed recesses 26 extending in the longitudinal center axis direction L of the screw cap, between the grooves and the edge 24 of the first part. Each of the recesses 26 is associated and in direct connection with a respective one of the grooves 22. They extend, just like the grooves 22, all the way through the wall 20, from the inside to the outside. Each pair of recess and groove together with the edge 24 of the first part defines a respective tamper flap 28 extending from a base 30 to an edge 32. For reasons that will be obvious later, the surface of a recess defining the edge 32 of the respective tamper flap 28 extends into the wall 20 with a predetermined angle in relation to the radial direction R of the screw so as to give the recess the shape of a wedge.

The screw cap according to FIGS. 1a and 1b has a construction which makes it relatively easy to manufacture. It can be manufactured by injection-molding with an inner and an outer die formed in such a way that the recesses as well as the grooves are automatically produced when the inner and outer dies are pressed together with a melt of a suitable thermoplastic there between. Thus, no additional operation, such as a cutting operation, is required to obtain the recesses and the grooves.

Figure 2A:
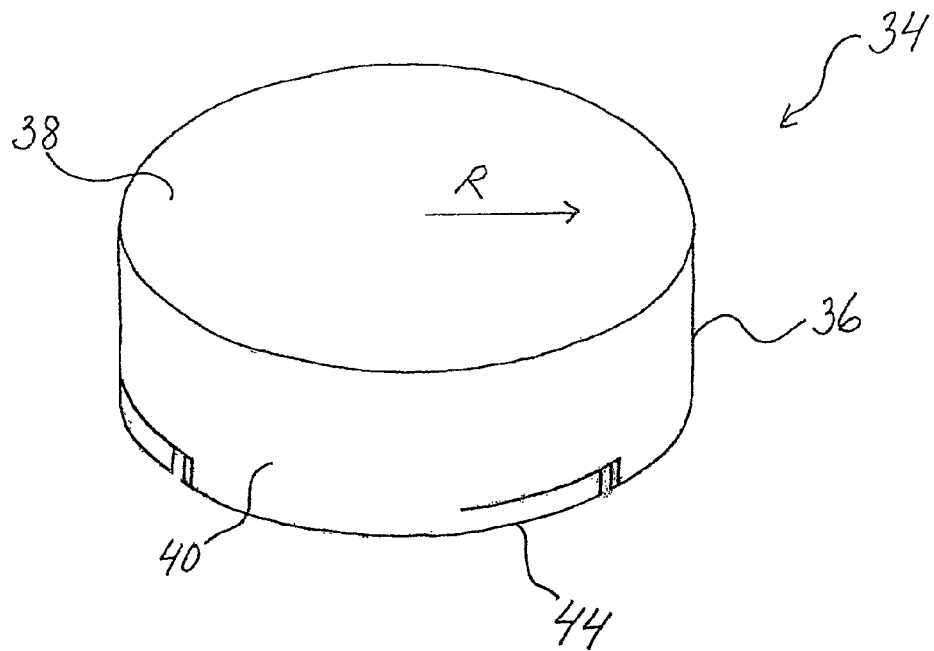
FIGS. 2a and 2b are perspective views of a screw cap according to a second embodiment of the present invention.
Figure 2B:
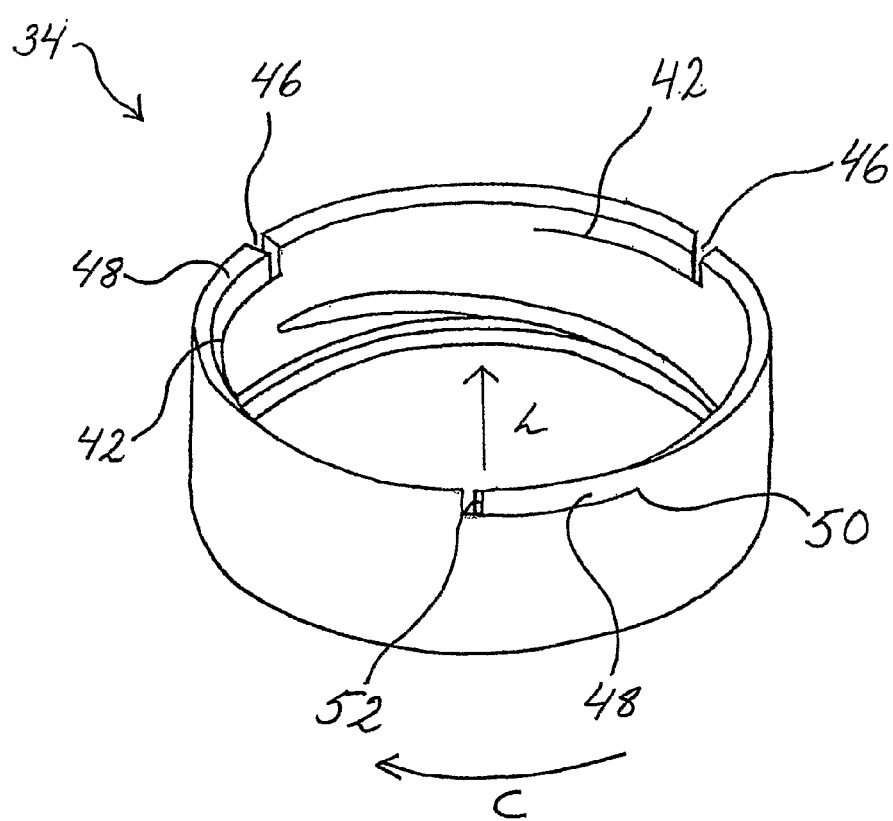

FIGS. 2a and 2b show another screw cap 34 for use with a packaging container in the form of a carton bottle of the initially described type, i.e. comprising a thermoplastic top and a laminate sleeve. Just like the screw cap illustrated in FIGS. 1a and 1b, the screw cap 34 is comprised of a tubular threaded first part 36 and a disc shaped second part 38, which are integrally molded of polypropylene. A wall 40 of the first part 36 is provided with three evenly distributed weakenings in the shape of slits 42. The slits are very narrow but extend all the way through the wall 40 and in the circumferential direction C of the screw cap 34 at a distance from an edge 44 of the first part 36. Further, the wall 40 is provided with three evenly distributed recesses 46 extending all the way through the wall and in the longitudinal center axis direction L of the screw cap, between the slits 42 and the edge 44 of the first part. Just like above, each of the recesses 46 is associated and in direct connection with a respective one of the slits 42. Further, a tamper flap 48 is defined by each pair of recess and slit together with the edge 44 of the first part 36, which tamper flap extends from a base 50 to an edge 52. Also, the surface of a recess defining the edge 52 of the respective tamper flap 48 extends into the wall 40 with a predetermined angle in relation to the radial direction R of the screw cap so as to give the recess the shape of a cut wedge.

The screw cap according to FIGS. 2a and 2b has a relatively straight-forward construction but may require an extra cutting operation for obtaining the slits. Such a cutting operation may be very complicated since it is extremely difficult to make the slits in the right position in relation to the corresponding recesses.

Figure 3A:
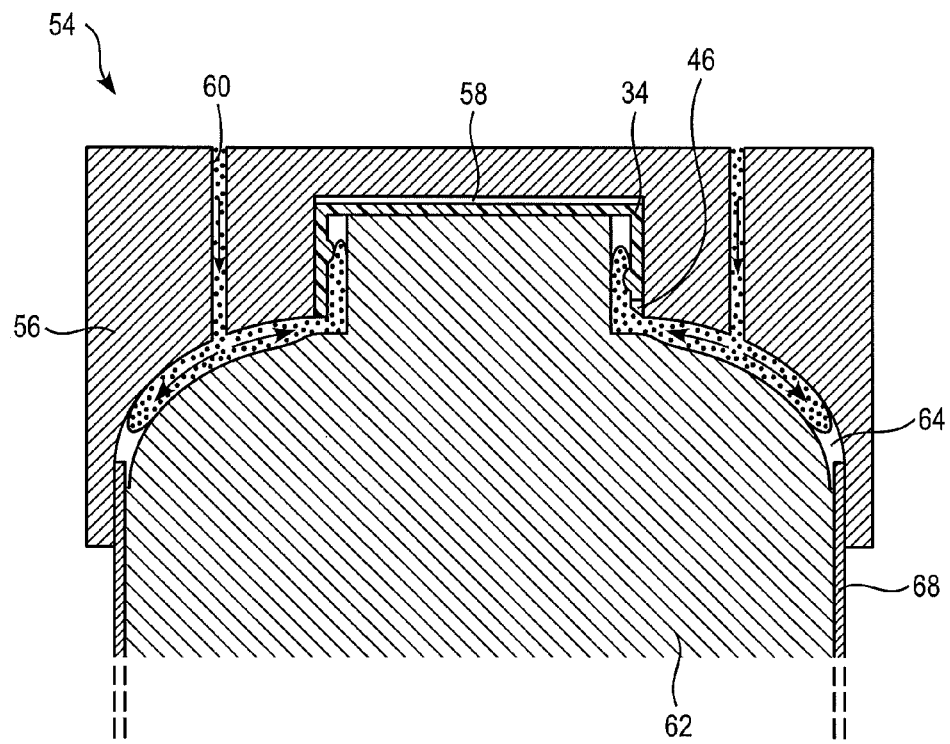
FIGS. 3a and 3b are cross sectional views of a tool in manufacturing of a packaging container with an opening device according to the present invention formed in accordance with a method according to the present invention.
Figure 3B:
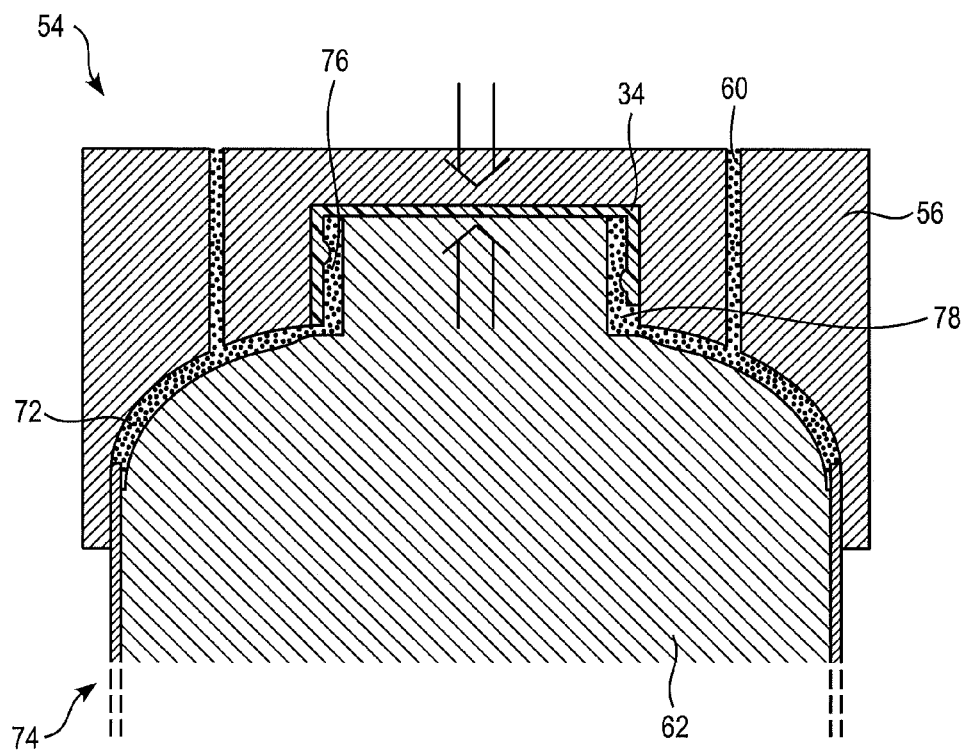

An opening device according to the invention comprises a screw cap 10 or 34 as described above and a neck portion of a top of a carton bottle. FIGS. 3a and 3b show a tool 54, in two different states, by means of which the inventive opening device, and thus a carton bottle, can be produced. The tool 54 comprises a female die 56 provided with a cap receiving space 58 and channels 60 for injection of a melt. Further, the tool 54 comprises a male die 62 which is insertable into the female die to form a top mold cavity 64 there between. More particularly, the mold cavity is formed of the dies together with the cap. The tool 54 works in accordance with an injection-compression molding technique described in U.S. Pat. No. 5,667,745, which is hereby incorporated herein by reference.

In a first production step, a screw cap is arranged in the cap receiving space 58 of the female die 56 and a sleeve 68 of packaging laminate is slipped onto the male die 62. The screw cap is of the type shown in FIGS. 2a and 2b (and thus denoted 34) but it is here merely schematically illustrated. As described above, the screw cap has three slits 42 (not shown) and three recesses 46, of which only one recess can be seen in FIGS. 3a and 3b. In a second production step, the male die 62, and thus one end of the sleeve 68, is inserted into the female die 56 and, as apparent from FIGS. 3a and 3b, also into the screw cap 34. After the second production step, the dies 56 and 62 will be arranged as illustrated in FIG. 3a. The state of the tool 54 in FIG. 3a is such that the volume of the top mold cavity 64 is larger than the volume of thermoplastic material required to form the top of the carton bottle. In a third production step, a volume of a melt corresponding to one top is introduced into the top mold cavity 64 through the channels 60. The melt spreads in the cavity but will not, as apparent from FIG. 3a, fill it entirely, because of the larger volume of the cavity. In a fourth production step, the male die is inserted further into the female die. After the fourth production step, the dies will be arranged as illustrated in FIG. 3b. The state of the tool 54 in FIG. 3b is such that the volume of the top mold cavity 64 is essentially equal to the volume of thermoplastic material required to form the top of the carton bottle. By the compression required to change the state of the tool 54 from that in FIG. 3a to that in FIG. 3b, the melt is forced to fill every nook of the entire cavity volume to form the top 72 of the carton bottle 74 (only partially illustrated) including the neck portion 76 thereof. Hereby, also the recesses 46 of the screw cap 34 are filled with melt. This melt is formed as projections 78 of the neck portion 76 thus received in the corresponding recesses 46. The slits are not filled with melt since they are too narrow. After a short cooling period, the melt has set and the dies 56 and 62 can be separated to enable removal of the carton bottle which has an opening device according to the present invention. After filling and final forming, the carton bottle is ready for distribution.

Figure 4A:
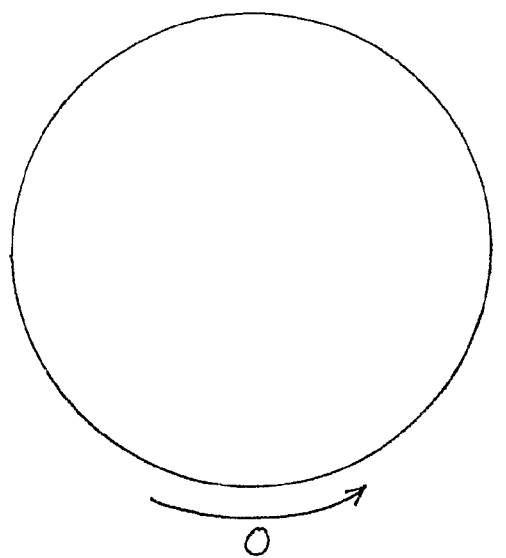
FIGS. 4a, 4b and 4c are views from above showing three different states of the screw cap in FIGS. 2a and 2b.
Figure 4B:
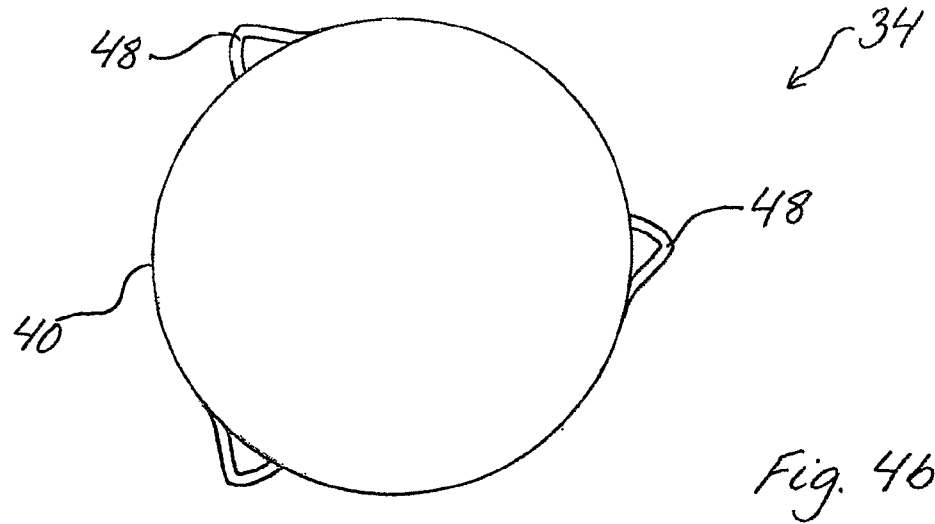
Figure 4C:
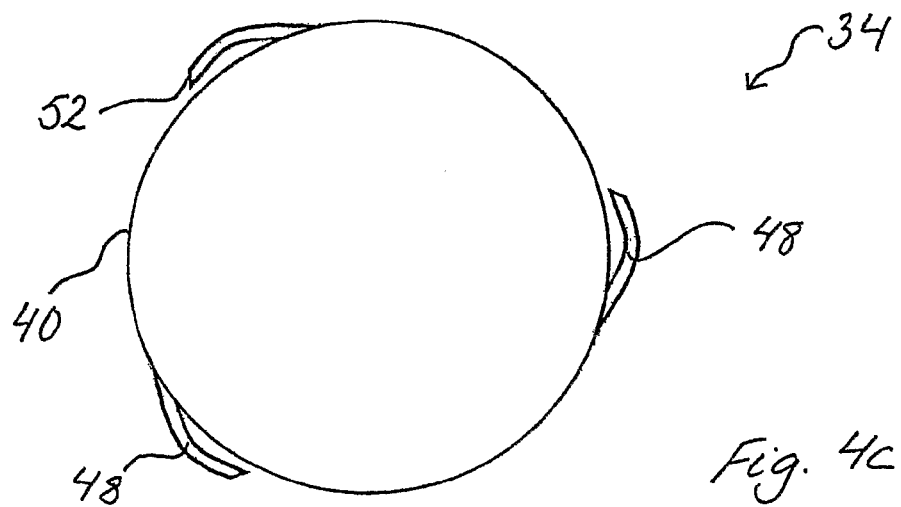

FIGS. 4a, 4b and 4c show, from above, the screw cap 34 of the carton bottle 74 in FIG. 3b in three different states. FIG. 4a shows the screw cap 34 when the carton bottle is unopened. FIG. 4b shows the screw cap 34 when the carton bottle is in the course of being opened. FIG. 4c shows the screw cap when the carton bottle has been opened once but closed again. In connection with a first time opening of the carton bottle, the screw cap is rotated in relation to the carton bottle in the opening direction O. The opening direction is determined by the construction of the screw cap. A screw cap construction as described above results in a counter-clockwise opening direction. Since the projections 78 of the neck portion 76 are received in the corresponding recesses 46 of the screw cap 34, the edges 52 of the tamper flaps 48 are trapped underneath the corresponding angled surfaces of the projections. Accordingly, ordinary movement of the tamper flaps in the opening direction is initially prevented. More particularly, during initial rotation of the screw cap a predetermined number of degrees, which number is dependent on the specific design of the opening device, e.g. the angle of the angled surface of the recess, the edges of the tamper flaps are obstructed by the respective projections of the neck portion. As illustrated in FIG. 4b, this results in a deformation of the tamper flaps which will form respective loops protruding from the wall 40 of the first part of the screw cap and growing with the cap rotation. After the initial rotation by the predetermined number of degrees, the edges 52 of the tamper flaps 48 are released from their engagement with the respective neck portion projections. Unobstructed rotation of the screw cap is then enabled and eventually the cap can be removed from the carton bottle. The deformation of the tamper flaps will remain to some extent even after release from the projection. As a result, as apparent from FIG. 4c, even when if the screw cap is put back onto the carton bottle, it will be obvious that the carton bottle has once been opened.

Figure 5A:
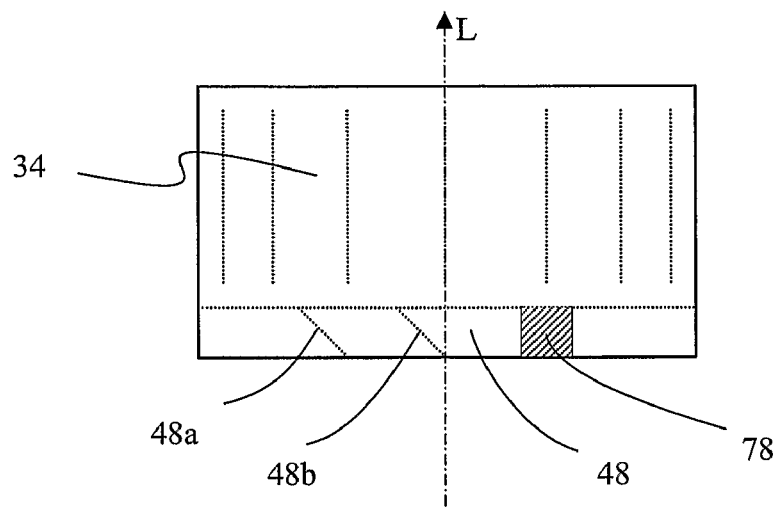
FIGS. 5a and 5b are side views and FIG. 5c is a top view of a screw cap according to a third embodiment of the present invention.
Figure 5B:
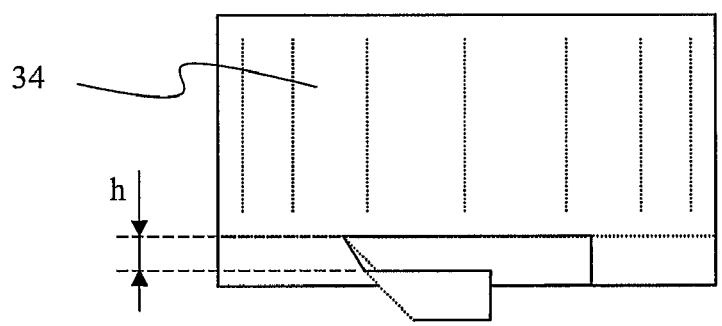
Figure 5C:
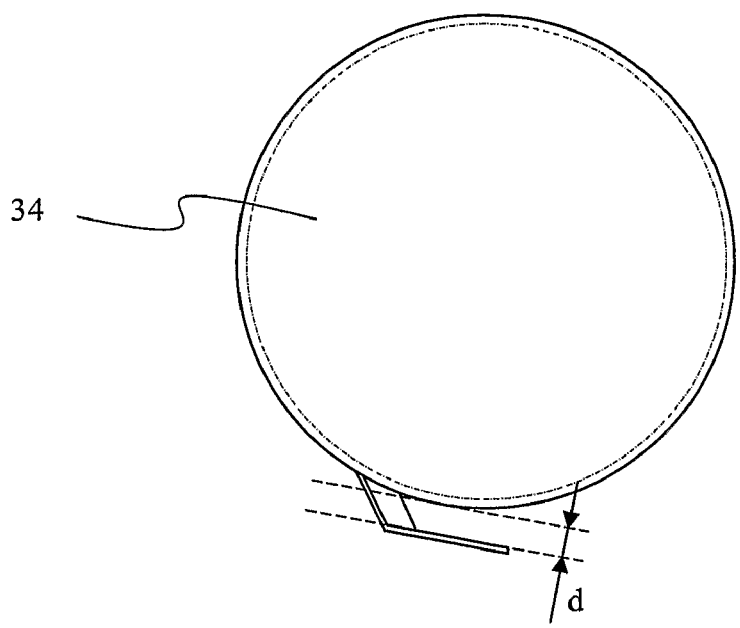

In FIGS. 5a to 5c, another example of a screw cap 34 is shown, wherein the tamper flaps 48 have a different form.

These flaps are provided with at least one diagonal weakening line 48a, 48b, which will give a displacement of the flap 48, after opening, away from the top of the screw cap 34 in a downward direction, as seen in FIG. 5b, as well as to the side, as seen in FIG. 5c. This will give a clear indication whether the screw cap has been opened or not, and this indication will be visible both from the top and from the side of the cap 34. A second weakening line 48b can be provided close to the end of the flap 48, such that the flap will not extend too far out from the screw cap, after opening. The distance the flap is projecting outwards is in the figure denoted d, and the distance the flap is projecting downwards is denoted h. In FIGS. 5a to 5c, only one tamper flap 48 is shown, but two, three, four or more tamper flaps can be provided on a screw cap according to the invention.

Above described is the production of a carton bottle with an inventive opening device comprising a screw cap of the type shown in FIGS. 2a and 2b. Naturally, a carton bottle with an opening device comprising a screw cap as shown in FIGS. 1a and 1b can be produced in a similar way. However, since the melt introduced in the top mold cavity is forced to spread in, and fill every nook of, the entire cavity when the male and female dies are pressed together, not only the recesses 26 but also the grooves 22 will be filled with melt. This melt is formed as projections of the neck portion of the top thus received in the corresponding recesses and grooves. Naturally, the projections received in the grooves will constitute an obstacle to areas of the screw cap outside the grooves in the opening direction. However, this will not be a problem in connection with opening of the package since each of the grooves is tapered at the base 30 of the respective tamper flap 28 and the screw cap is made of an elastic material.

The above-described embodiments should only be seen as examples. A person skilled in the art realizes that the embodiments discussed can be modified and varied in a number of ways without deviating from the inventive conception.

As an example, above, a so-called injection-compression technique has been used in the production of the carton bottles. However, other molding techniques could also be used, e.g. injection-molding with a mold cavity whose volume is kept constant throughout the molding operation.

As another example, above, a carton bottle comprising a top and a sleeve, which top is directly injection-molded onto the sleeve, has been described. Instead of producing a carton bottle like this, i.e. by injection-molding the whole top, including the neck portion, in one single step, the top could be produced in other ways. The top could, for example, be produced in two steps. In a first step, the neck portion could be separately injection-molded directly in the screw cap. In a second step, the rest of the top could be injection-molded between the neck portion and the sleeve. Of course, these two steps need not be performed directly after one another, which enables stock-keeping of pre-produced neck portions with respective caps. Obviously, a carton-bottle produced like this will have a joint, not only between the sleeve and the top, but also between the neck portion of the top and the rest of the top.

Further, the entire description above is directed towards a right-handed screw cap. Of course, the invention is equally applicable with a left-handed screw cap. Such a left-handed cap is obviously constructed differently from the right-handed cap. For example, the weakenings of a left-handed cap will have to extend in a direction opposite to the extension direction of the above described weakenings.

The above described screw caps have three tamper flaps each. Of course, they could have any number of tamper flaps and these tamper flaps do not have to be equidistantly arranged around the respective screw cap.

To achieve the desired deformation of the tamper flaps in connection with turning of the screw cap for a first-time opening of the carton bottle above, the recesses are formed in such a way that the edges of the tamper flaps are inclined away from a recess center line extending in the radial direction of the screw cap. In this way, the projection of the neck portion, which is injection-molded directly in the recess, will be arranged outside the tamper flap in the area of the edge. However, there exist many alternative ways in which the screw cap could be constructed to achieve the desired tamper flap deformation. For example, seen from a direction opposite the direction L shown in the figures, instead of being inclined as described above, the edge could be formed as an arrow pointing clockwise or counter-clockwise or a semicircular concave or convex arc. With either design, a part of each projection of the neck portion will be arranged outside a part of the edge of the respective tamper flap to achieve the initial entrapment of the tamper flap edge underneath the projection.

Finally, the screw cap and neck portion could be made of any suitable material, the ones given above just being exemplary. However, it is essential that the materials in the screw cap and the neck portion are adapted for direct injection-molding, i.e. injection-molding of one of the materials on the other, which is also called over-molding. The materials must not be welded together or stick to each other when the hot melt for producing the neck portion contacts the screw cap.

It should be stressed that a description of details not relevant to the invention has been omitted and that the figures are not drawn according to scale.

The invention claimed is:

1. An opening device for a packaging container, comprising:
   a neck portion having a projection; and
   a screw cap, the screw cap having a tubular first part arranged to enclose the neck portion and engage with the same to secure the screw cap to the packaging container and a second part arranged to close the first part at one end thereof,
   wherein a wall of the first part of the screw cap is provided with a weakening extending in a circumferential direction of the first part and a recess extending in a longitudinal center axial direction of the first part, the recess being arranged to receive the projection of the neck portion, which projection is directly injection-molded in the recess, and
   wherein a tamper flap of the first part, which tamper flap is defined by the weakening and the recess, is automatically deformable in connection with a first time opening of the packaging container by cap rotation because of an edge of the tamper flap, which edge is defined by a surface of the recess, being initially obstructed in a cap rotation direction by the projection of the neck portion.

2. An opening device according to claim 1, wherein the edge of the tamper flap is arranged to engage with the projection of the neck portion during initial rotation of the cap a predetermined number of degrees, during which initial rotation the tamper flap forms a growing loop projecting from the wall of the first part, and wherein the edge of the tamper flap is arranged to be released from engagement with the projection of the neck portion after the initial rotation of the cap the predetermined number of degrees.

3. An opening device according to claim 2, wherein a part of the projection initially is arranged outside at least a part of the edge of the tamper flap.

4. An opening device according to claim 3, wherein the surface of the recess defining said edge of the tamper flap extends into the wall of the first part with a predetermined angle in relation to a radial direction of the first part so that the surface, seen from an inner side of the screw cap, is inclined away from a center line of the recess, which center line extends in the radial direction of the first part.

5. An opening device according to claim 4, wherein the weakening is arranged at a distance from an edge of the first part, which edge surrounds an open end of the first part, and the recess is arranged between the edge and the weakening, the tamper flap being defined by the weakening, the recess and the edge.

6. An opening device according to claim 5, wherein the first part comprises upper and lower concentrically arranged tubular elements contacting each other along a contact line, the upper element being arranged between the second part of the screw cap and the lower element, a minimum distance between an inside of the lower element and a center axis of the first part being essentially equal to a minimum distance between an inside of the upper element and the center axis of the first part, and a maximum distance between an outside of the lower element and the center axis being larger than a maximum distance between an outside of the upper element and the center axis, the recess being formed in the lower element, and the weakening comprising a groove in the inside of the lower element being formed at the contact line between the upper and lower elements.

7. An opening device according to claim 1, wherein the tamper flap is provided with at least one weakening line which is angled with respect to the longitudinal center axial direction of the first part.

8. A method of forming an opening device for a packaging container, the opening device including a neck portion and a screw cap, the screw cap having a tubular first part arranged to enclose the neck portion and engage with the same to secure the screw cap to the packaging container and a second part arranged to close the first part at one end thereof, the method comprising arranging the screw cap in a receiving space of a female die with the first part facing outwardly, inserting a male die into the female die when the screw cap is arranged in the female die, the male die also being insertable into the screw cap, injecting a melt into a cavity formed between the screw cap and the male die to fill a recess extending in a longitudinal center axial direction of the first part with the melt and thereby form a projection of the neck portion which is received in the recess, the projection being arranged to cause an automatic deformation of a tamper flap of the first part, which tamper flap is defined by a weakening and the recess, in connection with a first time opening of the packaging container by cap rotation in a cap rotation direction, by initially obstructing, in the cap rotation direction, an edge of the tamper flap, which edge is defined by a surface of the recess, the weakening being in a wall of the first part of the screw cap and extending in a circumferential direction of the first part.

9. An opening device according to claim 1, wherein a part of the projection initially is arranged outside at least a part of the edge of the tamper flap.

10. An opening device according to claim 1, wherein the surface of the recess defining said edge of the tamper flap extends into the wall of the first part with a predetermined angle in relation to a radial direction of the first part so that the surface, seen from an inner side of the screw cap, is inclined away from a center line of the recess, which center line extends in the radial direction of the first part.

11. An opening device according to claim 1, wherein the weakening is arranged at a distance from an edge of the first part, which edge surrounds an open end of the first part, and the recess is arranged between the edge and the weakening, the tamper flap being defined by the weakening, the recess and the edge.

12. An opening device according to claim 1, wherein the first part comprises upper and lower concentrically arranged tubular elements contacting each other along a contact line, the upper element being arranged between the second part of the screw cap and the lower element, a minimum distance between an inside of the lower element and a center axis of the first part being essentially equal to a minimum distance between an inside of the upper element and the center axis of the first part, and a maximum distance between an outside of the lower element and the center axis being larger than a maximum distance between an outside of the upper element and the center axis, the recess being formed in the lower element, and the weakening comprising a groove in the inside of the lower element being formed at the contact line between the upper and lower elements.

13. An opening device according to claim 2, wherein the surface of the recess defining said edge of the tamper flap extends into the wall of the first part with a predetermined angle in relation to a radial direction of the first part so that the surface, seen from an inner side of the screw cap, is inclined away from a center line of the recess, which center line extends in the radial direction of the first part.

* * * * *